US009823953B2

(12) United States Patent
Thomas et al.

(10) Patent No.: US 9,823,953 B2
(45) Date of Patent: Nov. 21, 2017

(54) INTERPROGRAM COMMUNICATION MESSAGING FOR PROGRAM SYNCHRONIZATION

(71) Applicant: BANK OF AMERICA CORPORATION, Charlotte, NC (US)

(72) Inventors: Peter R. Thomas, London (GB); Gordon J. Weir, Esher (GB); Deborah A. Evans, London (GB); Paul J. Shepheard, Tonbridge (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/090,371

(22) Filed: Apr. 4, 2016

(65) Prior Publication Data

US 2017/0286192 A1    Oct. 5, 2017

(51) Int. Cl.
    *G06F 3/00*    (2006.01)
    *G06F 9/44*    (2006.01)
    *G06F 9/54*    (2006.01)
    *G06F 9/52*    (2006.01)
    *G06F 11/36*   (2006.01)

(52) U.S. Cl.
    CPC .............. *G06F 9/546* (2013.01); *G06F 9/52* (2013.01); *G06F 9/54* (2013.01); *G06F 11/3688* (2013.01)

(58) Field of Classification Search
    CPC .............................. G06F 9/54; G06F 11/3688
    USPC ............................................ 719/310; 717/124
    See application file for complete search history.

(56) References Cited

U.S. PATENT DOCUMENTS

| 7,111,055 | B2 * | 9/2006 | Falkner .................... G06F 8/61 709/221 |
| 7,363,033 | B2 | 4/2008 | Möller et al. |
| 7,779,303 | B2 | 8/2010 | Stubbs et al. |
| 8,239,835 | B2 | 8/2012 | Rex et al. |
| 8,266,592 | B2 | 9/2012 | Beto et al. |
| 8,423,962 | B2 | 4/2013 | Becker et al. |
| 8,745,589 | B2 | 6/2014 | Arumugham et al. |
| 8,812,911 | B2 | 8/2014 | Plamondon |
| 8,938,648 | B2 | 1/2015 | Augustine et al. |
| 8,949,673 | B2 | 2/2015 | Rapp et al. |
| 9,021,438 | B2 | 4/2015 | Dayan |

(Continued)

OTHER PUBLICATIONS

Pollyanna, Comparing and combining Sentiment Analysis Methods, Oct. 7, 2013.*

*Primary Examiner* — Lechi Truong
(74) *Attorney, Agent, or Firm* — Michael A. Springs

(57) ABSTRACT

An interprogram communication system including a product engine, a program interface, and a visibility engine configured to employ interprogram communication messaging with each other. The product engine sends an information request that identifies an application feature to the visibility engine via the program interface. The visibility engine identifies a feature file associated with the application feature and identifies test statuses associated with the identified feature file. The visibility engine combines the test statuses with feature file information associated with the feature file to generate a release snapshot. The visibility program sends the release snapshot to the product engine via the program interface. The product engine generates a summary that comprises the test statuses and at least a portion of the feature file information.

20 Claims, 7 Drawing Sheets

(56) References Cited

U.S. PATENT DOCUMENTS

| | | | | |
|---|---|---|---|---|
| 2003/0167423 A1* | 9/2003 | Murakami | ............... | G06F 8/71 |
| | | | | 714/38.14 |
| 2004/0103413 A1* | 5/2004 | Mandava | .............. | G06F 9/5055 |
| | | | | 718/100 |
| 2005/0195390 A1* | 9/2005 | Jeon | .................... | G06F 11/3688 |
| | | | | 356/237.2 |
| 2011/0314343 A1* | 12/2011 | Hoke | ................. | G06F 11/3696 |
| | | | | 714/45 |

\* cited by examiner

INTERPROGRAM COMMUNICATION MESSAGING FOR PROGRAM SYNCHRONIZATION

TECHNICAL FIELD

This disclosure relates generally to communicating between multiple programs in a computing device, and more specifically to systems and methods using interprogram communication messaging for triggering and tracking events between multiple programs in a computing device.

BACKGROUND

Typically programs in a computing device provide a limited set of tools and resources that are specific to a particular application. Each program operates as a stand-alone component and is generally unaware of events occurring in other programs. As a result, programs work independently and not cooperatively. It is desirable to provide the ability for multiple programs to work cooperatively.

SUMMARY

In one embodiment, the disclosure includes an interprogram communication system including a product engine, a program interface, and a visibility engine configured to employ interprogram communication messaging with each other. The product engine sends an information request that identifies an application feature to the visibility engine via the program interface. The visibility engine identifies a feature file associated with the application feature and identifies test statuses associated with the identified feature file. The visibility engine combines the test statuses with feature file information associated with the feature file to generate a release snapshot. The visibility program sends the release snapshot to the product engine via the program interface. The product engine generates a summary that comprises the test statuses and at least a portion of the feature file information.

The present disclosure presents several technical advantages. For example, a system that employs interprogram communication to allow multiple programs within a computing device to communicate with each other to increase performance and efficiency of the computing device. In particular, the computing device may comprise a test program, a visibility program, and a product program may be configured to employ interprogram communication messaging to trigger and track events that occur within one or more of the programs and to exchange information among the programs. In one embodiment, the computing device is configured such that the visibility program is configured to communicate with the test program to allow the visibility program is able to track, store, and present information associated with the development of applications and application features without requiring manual actions by a user. In another embodiment, the computing device is configured such that the visibility program is configured to communicate with the product program to allow the visibility program to exchange information with the product program without requiring manual actions by the user.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
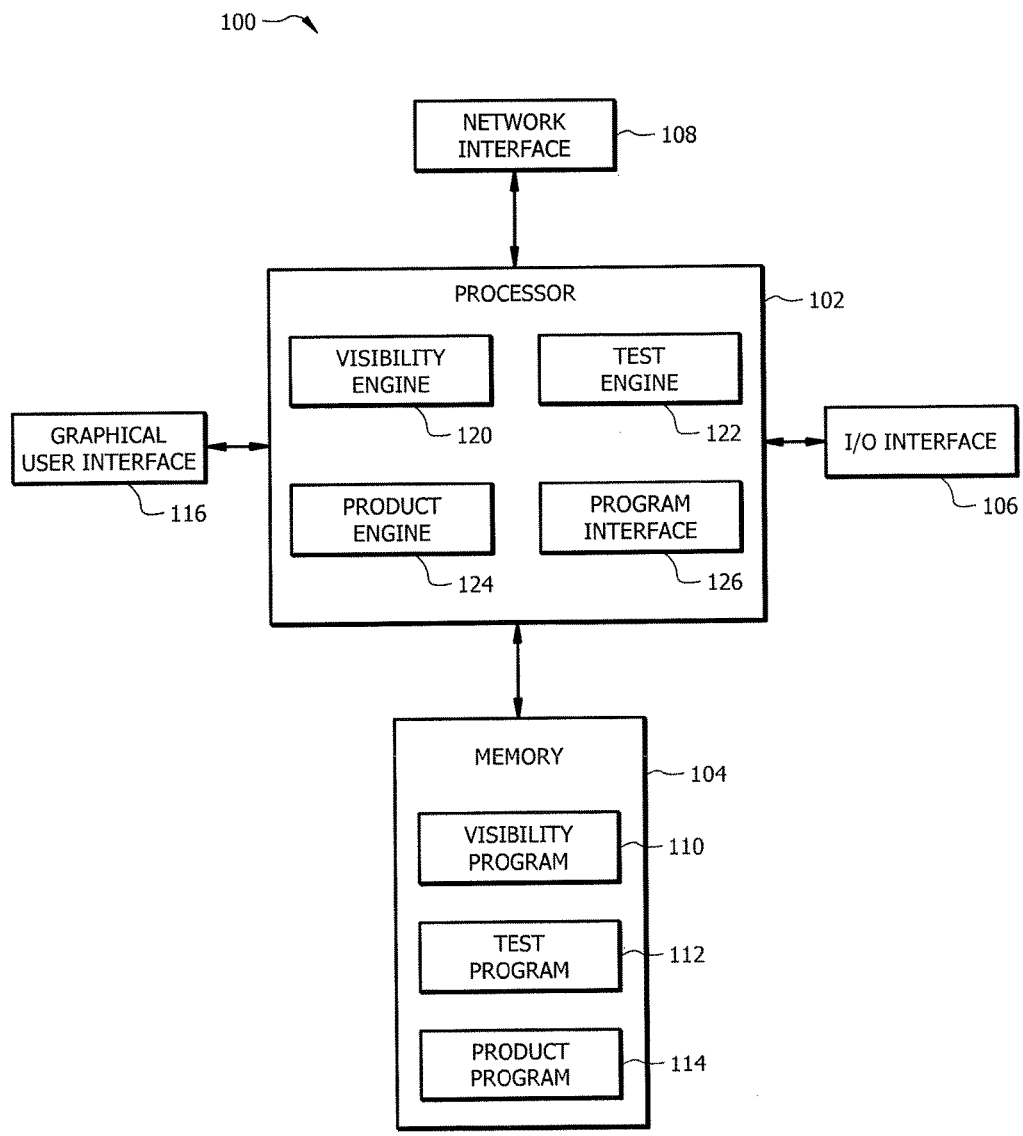
FIG. 1 is a schematic diagram of an embodiment of a device for implementing interprogram communications among multiple programs in a computing device.

Computing devices may comprise and employ numerous programs that allow a user to perform various tasks. Typically, each program works as a stand-alone software component that provides a limited set of tools and resources. Each program may work independently to perform various tasks. As a result, programs may be unaware of events that occur inside of other programs. Programs may also be unaware of information that is contained within other programs. Consequently, programs that are configured to work independently are limited to their current functionality. Using programs that work independently may cause several technical problems for the computing devices. For example, a computing device may employ multiple programs to perform various tasks. Actions and events that occur within each program will only be known to that program and the computing device is unable to coordinate any of the actions or events that occur within a program to other programs. Due to the compartmentalized nature of programs, the computing device is also unable to efficiently exchange data or information between multiple programs without manual intervention.

As an example, a developer may employ a computing device to execute a test program to develop and test software code for an application. During the lifecycle of an application, users may request features to be added, modified, or removed from the application. The test program may provide a limited set of tools and resources specific to developing and testing of software code. As a result, the computing device may require the developer to manually execute additional programs and/or to provide information to other programs for other functionalities such as tracking and monitoring the lifecycle of multiple applications and application features or generating summaries and documentation for developed applications and application features.

Interprogram communication is a technique that allows multiple programs within a computing device to communicate with each other. Programs may employ interprogram communication messaging to operate cooperatively rather than independently. For example, programs may employ interprogram communication messaging to trigger and track events that occur in other programs. Programs may also employ interprogram communication to exchange information between multiple programs. By employing interprogram communication messaging, a computing device can employ multiple programs simultaneously to perform complex tasks. This provides a technical solution to the previously discussed technical problems and improves the computing device in several ways. For example, a computing device may configure programs executing in the computing device to communicate with each other for actions such as triggering events to occur in other programs and/or for exchanging data and information among multiple programs. By configuring multiple programs to communicate with each other in a particular way, the computing device no longer requires manual intervention to share information or initiate events among multiple programs. Without the need for manual intervention, the efficiency and speed of the computing device may be improved by allowing the computing device to perform complex tasks and/or to share information using multiple programs autonomously. Sharing information among multiple programs may allow the programs to synchronize or update information with each other.

For example, the computing device may configure a test program to employ interprogram communication messaging with a visibility program to trigger and track events that occur during the development cycle of an application or application features. The test program may also employ interprogram communication messaging to send information associated with the development of various applications and application features. By configuring the test program to communicate with the visibility program, the visibility program is able to track, store, and present information associated with the development of applications and application features without requiring manual actions by the developer or user. The computing device may also configure the visibility program to employ interprogram communication messaging with a product program to provide information associated with the development of applications and application features to the product program. By configuring the visibility program to communicate with the product program, the visibility program is able to exchange information with the product program, for example, information related to applications and application features being developed by the test program, without requiring manual actions by the user. By employing interprogram communication messaging the computing device configures the test program, the visibility program, and the product program to work together cooperatively to increase the performance and efficiency of the computing device.

FIG. 1 is a schematic diagram of an embodiment of a device 100 for implementing interprogram communications among multiple programs. Device 100 is configured to employ interprogram communication messaging to trigger and track events between a visibility program 110, a test program 112, and a product program 114. Using interprogram communication messaging allows the visibility program 110, the test program 112, and the product program 114 to communicate with each other to perform tasks and/or to exchange information with each other autonomously. For example, interprogram communication messaging may be used to trigger application feature status changes using the test program 112 and the visibility program 110. Interprogram communication messaging may also be used to trigger a request and information exchange between the visibility program 110 and the product program 114. By configuring the test program 112, the visibility program 110, and the product program 114 to communicate with each other, the device 100 may no longer require manual intervention to share information or initiate events among the test program 112, the visibility program 110, and the product program 114.

Examples of the device 100 include, but are not limited to, notebook computers, tablet computers, desktop computers, or any other suitable device as would be appreciated by one of ordinary skill in the art upon viewing this disclosure. Device 100 comprises a processor 102, a memory 104, an input/output (I/O) interface 106, a network interface 108, and a graphical user interface (GUI) 116. Device 100 may be configured as shown or in any other suitable configuration.

The processor 102 may be implemented as one or more central processing unit (CPU) chips, logic units, cores (e.g. as a multi-core processor), field-programmable gate arrays (FPGAs), application specific integrated circuits (ASICs), or digital signal processors (DSPs). The processor 102 is operably coupled to and in signal communication with the memory 104, the I/O interface 106, the network interface 108, and the GUI 116. The processor 102 is configured to receive and transmit electrical signals among one or more of the memory 104, the I/O interface 106, the network interface 108, and the GUI 116. The processor 102 may be operably coupled to one or more other devices (not shown). The processor 102 is configured to process data and may be implemented in hardware or software.

The processor 102 may be configured to implement a visibility engine 120, a test engine 122, a product engine 124, and a program interface 126. In an embodiment, the visibility engine 120 may be implemented using logic units, FPGAs, ASICs, DSPs, or any other suitable hardware. The visibility engine 120 may also comprise any suitable set of instructions, logic, rules, or code operable to execute visibility program 110 and communication instructions for visibility program 110. The test engine 122 may be implemented using logic units, FPGAs, ASICs, DSPs, or any other suitable hardware. The test engine 122 may also comprise any suitable set of instructions, logic, rules, or code operable to execute test program 112 and communication instructions for test program 112. The product engine 124 may be implemented using logic units, FPGAs, ASICs, DSPs, or any other suitable hardware. The product engine 124 may also comprise any suitable set of instructions, logic, rules, or code operable to execute product program 114 and communication instructions for product program 114. The program interface 126 may be implemented using logic units, FPGAs, ASICs, DSPs, or any other suitable hardware. The program interface 126 may also comprise any suitable set of instructions, logic, rules, or code operable to communicate data among the visibility engine 120, the test engine 122, and the product engine 124. Additional details about the program interface 126 are described in FIG. 2.

The memory 104 may comprise one or more disks, tape drives, or solid-state drives, and may be used as an over-flow data storage device, to store programs when such programs are selected for execution, and to store instructions and data that are read during program execution. The memory 104 may be volatile or non-volatile and may comprise read-only memory (ROM), random-access memory (RAM), ternary content-addressable memory (TCAM), dynamic random-access memory (DRAM), and static random-access memory (SRAM). The memory 104 is operable to store the visibility program 110, the test program 112, the product program 114, and any other data or instructions (e.g. interprogram communication messaging instructions).

The visibility program 110 is a program or application configured to communicate with the test program 112 and the product program 114 to increase the functionality of the test program 112 and the product program 114. For example, the visibility program 110 may be configured to communicate with the test program 112 to track and visualize the status of an application and its features. As another example, the visibility program 110 may be configured to communicate with the product program 114 to exchange information associated with application features, for example, to generate a summary or documentation for application features. Additional details about the visibility program 110 are described in FIGS. 2 and 6.

The test program 112 is a program or application configured to develop and test code for applications and application features. For example, the test program 112 may be configured to allow a developer to generate and/or test code with feature files. The test program 112 may share test results from testing code with the visibility program 110 to track and/or visualize the test results. Additional details about the test program 112 are described in FIG. 2.

The product program 114 is a program or application configured to generate and present summaries about an application and its features. For example, the product program 114 may be configured to request information associated with released applications or released feature from the visibility program 110 and to generate or present documentation to a user based on the received information. Additional details about the product program 114 are described in FIG. 6.

The I/O interface 106 may comprise ports, transmitters, receivers, transceivers, or any other devices for transmitting and/or receiving data as would be appreciated by one of ordinary skill in the art upon viewing this disclosure. For example, the I/O interface 106 may be configured to communicate data between the processor 102 and peripheral hardware such as a mouse, a keyboard, or a touch sensor (e.g. a touch screen).

The network interface 108 may configured to enable wired and/or wireless communications and to communicate data through a network, system, and/or domain. For example, the network interface 108 may comprise or may be integrated with a modem, a switch, a router, a bridge, a server, or a client. The processor 102 may be configured to receive data using network interface 108 from a network or a remote source.

The GUI 116 may be configured to present visual information to a user using the device 100. For example, the GUI 116 may be employed to provide interfaces that allow the operator to view and interact with programs (e.g. the visibility program 110, the test program 112, and the product program 114) executed on the device 100. Examples of devices for implementing the GUI 116 include, but are not limited to, a light emitting diode (LED) display, an organic LED (OLED) display, an active matric OLED (AMOLED), a projector display, a cathode ray (CRT) monitor, or any other suitable type of display as would be appreciated by one of ordinary skill in the art upon viewing this disclosure.

Figure 2:
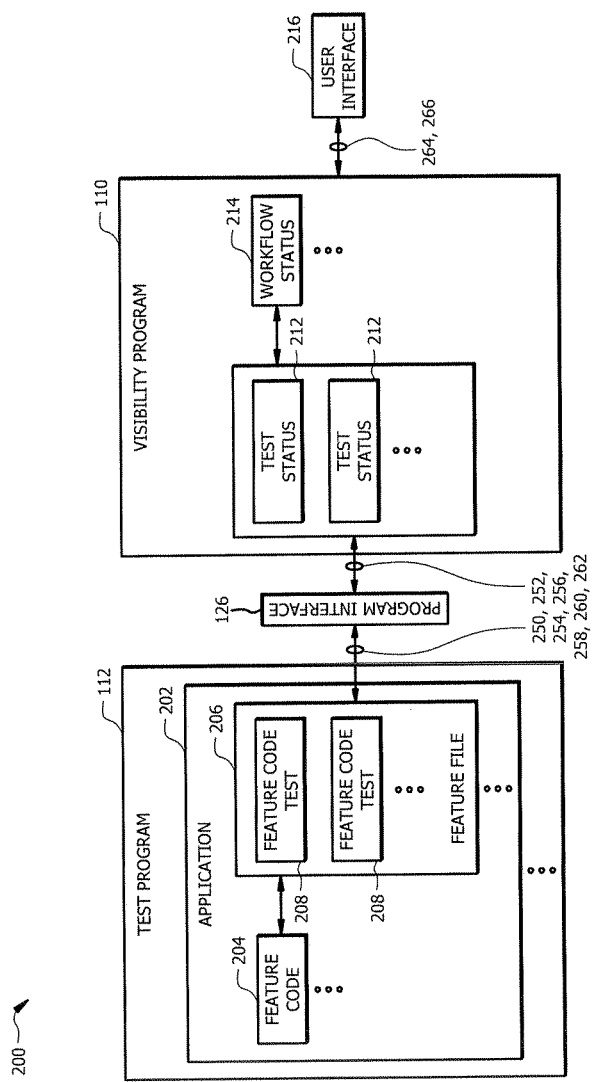
FIG. 2 is a schematic diagram of an embodiment of a configuration of a test program configured to communicate with a visibility program using interprogram communication messaging.

FIG. 2 is a schematic diagram of an embodiment of a configuration 200 of the test program 112 configured to communicate with the visibility program 110 using interprogram communication messaging. The test program 112 and the visibility program 110 are configured to exchange data and interprogram communication messages 250 with each other using the program interface 126 to trigger and track events associated with application features. In an embodiment, the test program 112 and the visibility program 110 are configured to use interprogram communication messaging to trigger and track events related to the development cycle of application features, the modification of application features, and the deletion of application features. The test program 112 and the visibility program 110 may also configured to use interprogram communication messaging to trigger and track any other events as would be appreciated by one of ordinary skill in the art upon viewing this disclosure.

The test program 112 may be executed or implemented using the test engine 124. The test program 112 is a program or application configured to allow a developer to develop and/or test software code. In one embodiment, the test program 112 may employ an open source framework to develop and test software code. The test program 112 may be configured to support the development and testing of one or more applications 202. An application 202 may be a software application for an end-user that comprises a plurality of features which provide some functionality to the application 202. Application 202 features may be associated with one or more feature codes 204 and one or more feature files 206.

The test program 112 may use feature code 204 to implement an application feature. Feature code 204 comprises software code that is associated with one or more application 202 features. Feature code 204 may be generated by a developer to generate a new feature for application 202 features. For example, a developer may generate feature code 204 for a new application 202 feature in response to a request for a new application feature. Existing feature code 204 may be modified by a developer to modify an existing application 202 feature. For example, a developer may modify existing feature code 204 to change the functionality of an existing application 202 feature in response to a request to modify the application feature. In one embodiment, feature code 204 may be generated or modified using the test program 112. In another embodiment, feature code 204 may be generated or modified by another program and imported into the test program 112.

The test program 112 may use feature files 206 to manage and test the functionality of an application feature that is being implemented by a feature code 204. A feature file 206 may comprise one or more feature code tests 208 linked to or associated with the feature code 204. In an embodiment, a feature code test 208 may comprise one or more inputs that are linked to a feature code 204 and one or more outputs configured to output test results. The test program 112 may employ feature code tests 208 to test one or more functionalities of a feature code 204. A feature code test 208 may be associated with a particular functionality implemented by the feature code 204. The test program 112 may use feature code tests 208 to test the functionality of feature code 204 and the test results to determine whether the feature code 204 passes or fails feature code tests 208 associated with the feature code 204.

As an example, feature code 204 may be associated with a first feature code test 208 and a second feature code test 208 in a feature file 206. The first feature code test 208 may be configured to indicate whether feature code 204 passes the first feature code test 208 to provide a first functionality. In other words, the first feature code test 208 indicates whether the feature code 204 provides the functionality that is being tested by the first feature code test 208. Similarly, the second feature code test 208 may be configured to indicate whether the feature code 204 provides a second functionality.

Feature code tests 208 may be configured to indicate whether a particular functionality of the feature code 204 is in a passed state or in a failed state. The test program 112 may use the outputs (e.g. test results) of the feature code tests 208 to indicate the current status of the feature code 204 to the visibility program 110.

The test program 112 may associate a state with each feature file 206 to indicate an aggregate state for the feature file 206 based on the feature code tests associated with the feature file 206. A feature file 206 may be in passed state when all of the feature code tests 208 associated with feature code 204 are in a passed state. In other words, the feature file 206 is in a passed state when the feature code 204 is able to provide the requested feature functionality. A feature file 206 may be in a failed state when one or more of the feature code tests 208 associated with the feature code 204 are in a failed state. In other words, the feature file 206 is in a failed state when the feature code 204 is not able to provide the requested feature functionality. The test program 112 may also use the state of the feature file 206 to indicate the current status of the feature code 204 to the visibility program 110.

In one embodiment, feature files 206 and feature code tests 208 may be generated or modified using the test program 112. In another embodiment, feature files 206 and feature code tests 208 may be generated or modified by another program and imported into the test program 112. The test program 112 is configured to send test results associated with the feature code tests 208 to the visibility program 110. For example, the test program 112 may send an interprogram communication message 250 that indicates whether feature code tests 208 and/or feature files 206 are in a failed state or a passed state.

Feature files 206 may further comprise other information associated with an application feature. Examples of other information include, but are not limited to, feature names, narratives, and test scenarios. Feature file 206 information may be shared with other programs (e.g. product program 114), for example, to create summaries or documentation for an application feature associated with a feature file 206. An example of exchanging feature file 206 information is described in FIG. 7.

Feature notifications 252 may be used by the test program 112 and the visibility program 110 to coordinate events associated with generating a new application feature. In an embodiment, the test program 112 may be configured to send a feature notification 252 that identifies a feature file 206 and one or more feature code tests 208 in the feature file 206 to the visibility program 110. Feature notifications 252 may be used to trigger the visibility program 110 to associate test statuses 212 with feature code tests 208 in the feature file 206 and a workflow status 214 with the feature file 206. An example of using feature notifications 252 is described in FIG. 3.

Feature update notifications 254 may be used by the test program 112 and the visibility program 110 to coordinate events associated with modifying an existing application feature. The test program 112 may be configured to send a feature update notification 254 that identifies a feature file 206 and one or more feature code tests 208 to the visibility program 110. Feature update notifications 254 may be used to trigger the visibility program 110 to modify test statuses 212 associated with feature code tests 208 and the workflow status 214 associated with the feature file 206. An example of using feature update notifications 254 is described in FIG. 4.

Delete requests 256 may be used by the test program 112 and the visibility program 110 to coordinate events associated with deleting an application feature. The test program 112 is also configured to send a delete request 256 that identifies a feature file 206 and/or one or more feature code tests 208 in the feature file 206 to the visibility program 110. Delete requests 256 may be used to trigger the visibility program 110 to modify the status of test statuses 212 and the workflow status 214 to indicate that an application feature has been deleted in response to the delete request 256. An example of using a delete request 256 is described in FIG. 5.

The program interface 126 is configured to communicate data and interprogram communication messages 250 between the test program 112 and the visibility program 110 using program interface 126. An example of the program interface 126 includes, but is not limited to, an application programming interface (API). Examples of interprogram communication messages 250 that are communicated between the test program 112 and the visibility program 110 include, but are not limited to, feature notifications 252, feature update notifications 254, delete requests 256, feature file 206 test results 258, delete confirmations 260, delete confirmation response 262, and any other type of information.

The program interface 126 may be configured to allow the visibility program 110 to support and/or process data and interprogram communication message 250 in a variety of languages and formats. In an embodiment, the program interface 126 is configured to transform feature file 206 test results 258 (e.g. feature code test 208 results) from a first language or format to a second language or format. For example, the program interface 208 may be configured to modify the feature file 206 test results 258 associated with test program 112 to transform the test results into a particular format suitable for the visibility program 110. In an embodiment, the program interface 126 may be configured to transform test results 258 using a look-up table that maps test results 258 between a first language or format to a second language or format. Alternatively, the program interface 126 may be configured to employ any other suitable technique as would be appreciated by one of ordinary skill in the art upon viewing this disclosure. In an embodiment, the program interface 126 may be integrated with the visibility program 110.

In an embodiment, the visibility program 110 may be configured to communicate with the test program 112 to monitor and store information (e.g. test results) associated with application features from the test program 112. The visibility program 110 may be executed or implemented using the visibility engine 120. The visibility program 110 is configured to communicate data with the test program 112 and the user interface 216. For example, the visibility program 110 may be configured to receive feature notifications 252 that identify a feature file 206 and one or more feature code tests 208 associated with the feature file 206. The visibility program 110 may be configured to associate the one or more test statuses 212 and a workflow status 214 with the feature file 206 in response to receiving the feature notification 252. An example of the visibility program 110 responding to a feature notification 252 is described in FIG. 3.

The visibility program 110 may also be configured to receive a feature update notification 254 that identifies a feature file 206 and one or more feature code tests 208 associated with the feature file 206. The visibility program 110 may be configured to identify one or more test statuses 212 and a workflow status 214 with the feature file 206 and to update the status of the test statuses 212 and/or workflow status 214 in response to receiving the feature update notification 254. An example of the visibility program 110 responding to a feature update notification 254 is described in FIG. 4.

Test results 258 may be sent by the test program 112 to the visibility program 110 to coordinate events associated with storing information about the status of an application feature. The visibility program 110 may also be configured to receive feature file 206 test results 258 (e.g. feature code test 208 results) from test program 112. The visibility program 110 may be configured to modify one or more test statuses 212 and/or workflow statuses 214 associated with the feature file 206 based on the test results 258. Examples of the visibility program 110 receiving test results 258 are described in FIGS. 3 and 4.

The visibility program 110 may also be configured to receive a delete request 256 that identifies a feature file 206 and/or one or more feature code tests 208 associated with the feature file 206. The visibility program 110 may be configured to identify one or more test statuses 212 and a workflow status 214 with the feature file 206 and to modify the status of the test statuses 212 and/or workflow status 214 to indicate that an application feature has been deleted in response to receiving the delete request 256. For example, the visibility program 110 may be configured to set the test statuses 212 to a failed state and/or set workflow status 214 to a deleted state. An example of the visibility program 110 responding to a delete request 256 is described in FIG. 5.

Sign-off commands 264 may be used by the visibility program 110 and the user interface 216 to coordinate events associated approving the status of an application feature. The visibility program 110 may also be configured to receive sign-off commands 264. The visibility program 110 may be configured to set a workflow status 214 to a signed state in response to the sign-off command 264. Examples of the visibility program 110 receiving a sign-off command 264 are described in FIGS. 3-5.

The visibility program 110 may use test statuses 212 to track the testing status of an application feature or a feature code 204 that is being developed. One or more test statuses 212 may be associated with a feature file 206. Each test status 212 comprises information that indicates the status of a test within a feature file 206. For example, a first test status 212 may be associated with a first feature code test and a second test status 212 may be associated with a second feature code test in feature file 206. The first test status 212 and the second test status 212 may be configured to indicate whether the first feature code test 208 and the second feature code test 208 are in a passed state or failed state, respectively. In an embodiment, a test status 212 may be configured by default to indicate a pending state when the status of an associated feature code test 208 is unknown. For example, a test status 212 may be configured to indicate a feature code test 208 is in a pending state when the feature code 204 has not been tested yet. In another embodiment, a test status 212 may be configured by default to indicate a failed state when the status of an associated feature code test 208 is unknown.

The visibility program 110 may use work statuses 214 to track the development status of an application feature or a feature code 204 that is being developed. The visibility program 110 may comprise one or more workflow statuses 214. A workflow status 214 may be associated with one or more test statuses 212 for a feature file 206. A workflow status 214 comprises information that indicates an aggregate or combined status of the one or more test statuses 212 associated with a feature file 206. In an embodiment, a workflow status 214 may be configured to indicate a work-in-progress state, a done state, a deleted state, and a signed state. For example, a workflow status 214 may be configured to indicate a work-in-progress state when one or more of the test statuses 212 associated with the feature file 206 are in a pending state or a failed state. A workflow status 214 may be configured to indicate a done state when all of the test statuses 208 associated with the feature file 206 are in a passed state. A workflow status 214 may be configured to indicate a deleted state when a feature file 206 has been deleted. For example, workflow statuses 214 may be set to a deleted state in response to a delete request 256.

The visibility program 110 may be configured to indicate whether an application feature has been reviewed and/or approved by an authorized user. Workflow statuses 214 may be configured to indicate a signed state when all of the test statuses 208 associated with the feature file 206 are in a passed state and the visibility program 110 has received a sign-off command 264 from a user, for example, via the user interface 216. In an embodiment, the visibility program 110 may also be configured to send workflow status notifications 266 to user interface 216 in response to a status change of a workflow status 214.

The visibility program 110 may be configured to indicate whether an application feature has been approved for release or distribution. For example, the visibility program 110 may be configured to indicate that an application feature associated with the feature file 206 is in a released state when the workflow status 214 associated with the feature file 206 is in a signed state. Otherwise, the visibility program 110 may be configured to indicate that an application feature associated with the feature file 206 is in an unreleased state when the workflow status 214 associated with the feature file 206 is not in a signed state.

The visibility program 110 may be configured to store test statuses 212, workflow statuses 214, application status, feature file information, and/or any other information associated with an application feature, for example, in a repository or memory (e.g. memory 104). The visibility program 110 may share stored information with other programs (e.g. product program 114). An example of exchanging information stored by the visibility program 110 is described in FIG. 7.

The user interface 216 may be used as an interface to review and/or approve application features. For example, the user interface 216 may be used by a user to approve the release or deletion of an application feature. In an embodiment, the user may be an administrator with special access or authority rights and privileges. The user interface 216 may be configured to access test statuses 212 and workflow statuses 214 in the visibility program 110 to display the test statuses 212 and/or the workflow statuses 214 and to allow a user to send sign-off commands 264 to the visibility program 110. A sign-off command 264 may indicate that a user approves an application feature for release or deletion. In an embodiment, the user interface 216 may be implemented using the GUI 116 and/or peripheral hardware such as a keyboard, a mouse, or a touch screen. For example, the user interface 216 may be configured to display the current status of test statuses 212 and workflow statuses 214 in the visibility program 110 to a user. The user may indicate to send a sign-off command 264 using the user interface 216 upon reviewing the current status of an application feature. For example, the user interface 216 may be configured to send sign-off commands 264 in response to a user action using the peripheral hardware. In an embodiment, the user interface 216 may be integrated with the visibility program 110. Information about the user sending the sign-off command 264 may be stored, for example, in memory 104, in response to receiving a sign-off command 264. Information about the user may comprise a user name, a user alias, a date stamp, or any other information associated with the user or temporal information associated with the sign-off command 264.

Figure 3:
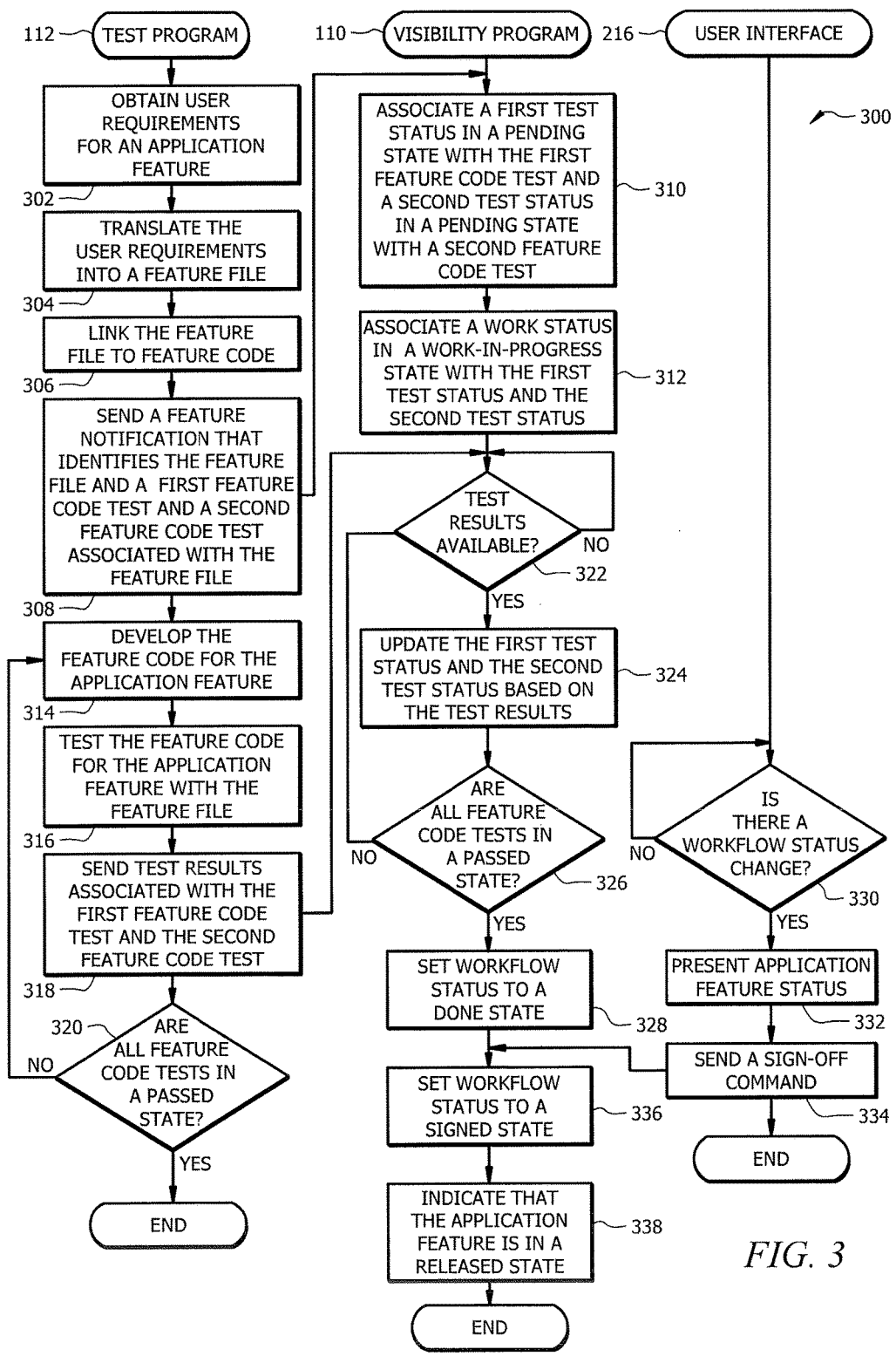
FIG. 3 is a protocol diagram of an embodiment of a feature development method using the test program and the visibility program.

FIG. 3 is a protocol diagram of an embodiment of a feature development method 300 using the test program 112 and the visibility program 110. Method 300 may be employed to use interprogram communication messaging to trigger and track events during the development cycle of an application feature. In order to perform method 300, the test engine 122 is configured to implement a specific algorithm using the test program 112 and the visibility engine 120 is also configured to implement a specific algorithm using the visibility program 110. In an embodiment, the test program 112 may send interprogram communication messages 250 to the visibility program 110 to generate test statuses 212 and workflow statuses 214 associated with feature file 206 for a new application feature. The feature file 206 is associated with feature code 204 for the new application feature. The test program 112 may send interprogram communication messages 250 to the visibility program 110 to trigger status changes for the test statuses 212 and workflow status 214 based on events during the development and testing of the feature code 204. The visibility program 110 modifies test statuses 212 and workflow status 214 in response to the interprogram communication messages 250 from test program 112. The visibility program 110 then allows a user to review test statuses 212 and workflow status 214 for application features and to modify workflow statuses 214 in response to sign-off commands 264 from the user.

At step 302, the test program 112 obtains user requirements for an application feature. The user requirements may comprise information describing the functionality of the application and/or performance requirements or performance metrics for the application feature. For example, a developer may receive user requirements from an application user that described a requested application feature and the developer may provide the user requirements to the test program 112. The user requirements may be in plain English or in a technical language (e.g. pseudocode). In an embodiment, the user requirements may need to be translated from plain English to a computer readable language and/or format suitable for testing such as a feature file 206. At step 304, the test program 112 translates the user requirements into a feature file 206. The feature file 206 may comprise one or more tests (e.g. feature code tests 208) that may be used to determine whether particular functionalities are available. At step 306, the test program 112 links the feature file 206 to a feature code 204. The feature file 206 is linked to the feature code 204 to allow the test program 112 to perform tests on the feature code 204 to tests is functionality. The test program 112 may associate one or more feature tests 208 to the feature code 204 to test various functionalities of the feature code 204. The one or more feature code tests 208 may be initialized in a failed state.

The test program 112 may communicate with the visibility program 110 to track the status of the application feature. At step 308, the test program 112 sends a feature notification 252 that identifies the feature file 206 and the one or more feature code tests 208 to the visibility program 110. As an example, the feature notification 252 may identify a first feature code test 208 and a second feature code test 208 associated with the feature file 206. Sending the feature notification 252 may trigger the visibility program 110 to associate test statuses 212 with the feature code tests 208 of the feature file 206 and a workflow status 214 with the feature file 206. The test program 112 may send the feature notification 252 via the program interface 126.

In response to the feature notification 252 the visibility program 112 may allocate one or more test statuses 212 and workflow statuses 214 for the application feature. At step 310, the visibility program 110 associates a first test status 212 in a pending state with the first feature code test 208 of the feature file 206 and a second test status 212 in a pending state with the second feature code test 208 of the feature file 206. At step 312, the visibility program 110 associates a workflow status 214 in a work-in-progress state with the first test status 212 and the second test status 212, which thereby associates the workflow status 214 with the feature file 206.

After the feature file 206 has been linked to the feature code 204, the developer may begin generating code for the application feature (i.e. the feature code 204). At step 314, the test program 112 develops the feature code 204 for the application feature. For example, the developer may generate or import code into test program 112 for the feature code 204 to implement various functionalities of the application feature. The developer may periodically test the functionality of the developed feature code 204 using the feature file 206. At step 316, the test program 112 tests the feature code 204 for the application feature with the feature file 206. For example, the feature code 204 may be tested using the feature code tests 208 to determine whether the feature code 204 achieves a particular functionality. The test program 112 modifies the status of the feature code tests 208 from a failed state to a passed state when the feature code 204 is able to achieve the functionality that is being tested by the feature code test 208. The test program 112 may periodically send test results 258 to the visibility program 110 to update the test statuses 212 and/or workflow statuses 214 associated with the feature file 206. At step 318, the test program 112 sends test results 258 associated with the first feature code test 208 and the second feature code test 208 of the feature file 206 to the visibility program 110. The test results 258 indicate whether the first feature code test 208 and the second feature code test 208 are in a failed state or in a passed state. The test program 112 may send the test results 258 via program interface 126. The test program 112 may continue to develop and test the feature code 204 until the request functionality is available. At step 320, the test program 112 determines whether all of the feature code tests 208 of the feature file 206 are in a passed state. The test program 112 returns to step 314 for further development and/or testing when one or more of the feature code tests 208 are not in a passed state. Otherwise, the test program 112 may wait for further instructions, user requirements, or requests, for example, by returning to step 302 or the test program 112 may terminate.

The visibility program 112 may periodically update the test statuses 212 associated with feature files 206 in the test program 110. At step 322, the visibility program 110 determines whether there are test results 258 available from the test program 112. In an embodiment, the visibility program 110 may receive test results 258 continuously as they become available. In another embodiment, the visibility program 110 may check for and receive test results 258 from the test program 112 at predetermined time intervals. The visibility program 110 proceeds to step 324 when test results 258 are available from the test program 112. Otherwise, the visibility program 110 continues to wait for test results 258. At step 324, the visibility program 110 updates the first test status 212 and the second test status 212 based on the test results 258. The visibility program 110 may change the status of the first test status 212 and/or the second test status 212 from a pending state to a failed state in response to receiving test results 258 that indicate the first feature code test 208 or the second feature test code 208 are in a failed state, respectively. The visibility program 110 may change the status of the first test status 212 and/or the second test status 212 from a failed state to a passed state in response to receiving test results 258 that indicate the first feature code test 208 or the second feature test code 208 are in a passed state, respectively.

The visibility program 112 may also periodically update the workflow statuses 214 associated with feature files 206 in the test program 110 by examining the test statuses 212 associated with the workflow status 214. At step 326, the visibility program 110 determines whether all of the feature code tests 208 of the feature file 206 are in a passed state. For example, the visibility program 110 may use the status of the first test status 212 and the second test status 212 to determine whether the first feature code test 208 and the second feature code test 208 are in a passed state, respectively. The visibility program 110 may determine that all of the feature code tests 208 of the feature file 206 are in a passed state when both the first test status 208 and the second test status 208 are in a passed state. The visibility program 110 proceeds to step 328 when all of the feature code tests 208 of the feature file 206 are in a passed state. Otherwise, the visibility program 110 returns to step 322 when one or more of the feature code tests 208 of the feature file 206 are not in a passed state. At step 328, the visibility program 110 sets the workflow status 214 to a done state in response to determining that all of the feature code tests 208 of the feature file 206 are in a passed state.

An authorized user may use the user interface 216 to review and approve application features that are being developed by test program 112. At step 330, the user interface 216 determines whether there is workflow status 214 change. In an embodiment, the user interface 216 may receive a workflow status notification 266 from the visibility program 110 when the workflow status 214 changes. In another embodiment, a user using the user interface 216 may interrogate the visibility program 110 about a particular workflow status 214. The user interface 216 proceeds to step 332 when the user interface 216 determines that there has been a workflow status 214 change. Otherwise, the user interface 216 may continue to wait and check for workflow status 214 changes. At step 332, the user interface 216 presents the workflow status 214 associated with an application feature to a user. For example, the user interface 216 may present the workflow status 214 on the GUI 116 to a user. At step 334, the user interface 216 sends a sign-off command 264 to the visibility program 110. For example, the user interface 216 may receive a user action from a peripheral hardware and may sent the sign-off command 264 to the visibility program 110 in response to receiving the user action. The user interface 216 may wait for other workflow status changes, for example, by returning to step 330, or the user interface 216 may terminate.

The visibility program 110 may update the workflow status 214 of application features being developed to indicate whether they have been approved for release by an authorized user. At step 336, the visibility program 110 sets the workflow status 214 to a signed state in response to receiving the sign-off command 264 from the user interface 216. Setting the workflow status 214 to the signed state may indicate that a user approves of the application feature for release. At step 338, the visibility program 110 indicates that the application feature is in a released state in response to setting the workflow status 214 to the signed state. The visibility program 110 may wait for other interprogram communication messages 250 or the visibility program 110 may terminate.

Figure 4:
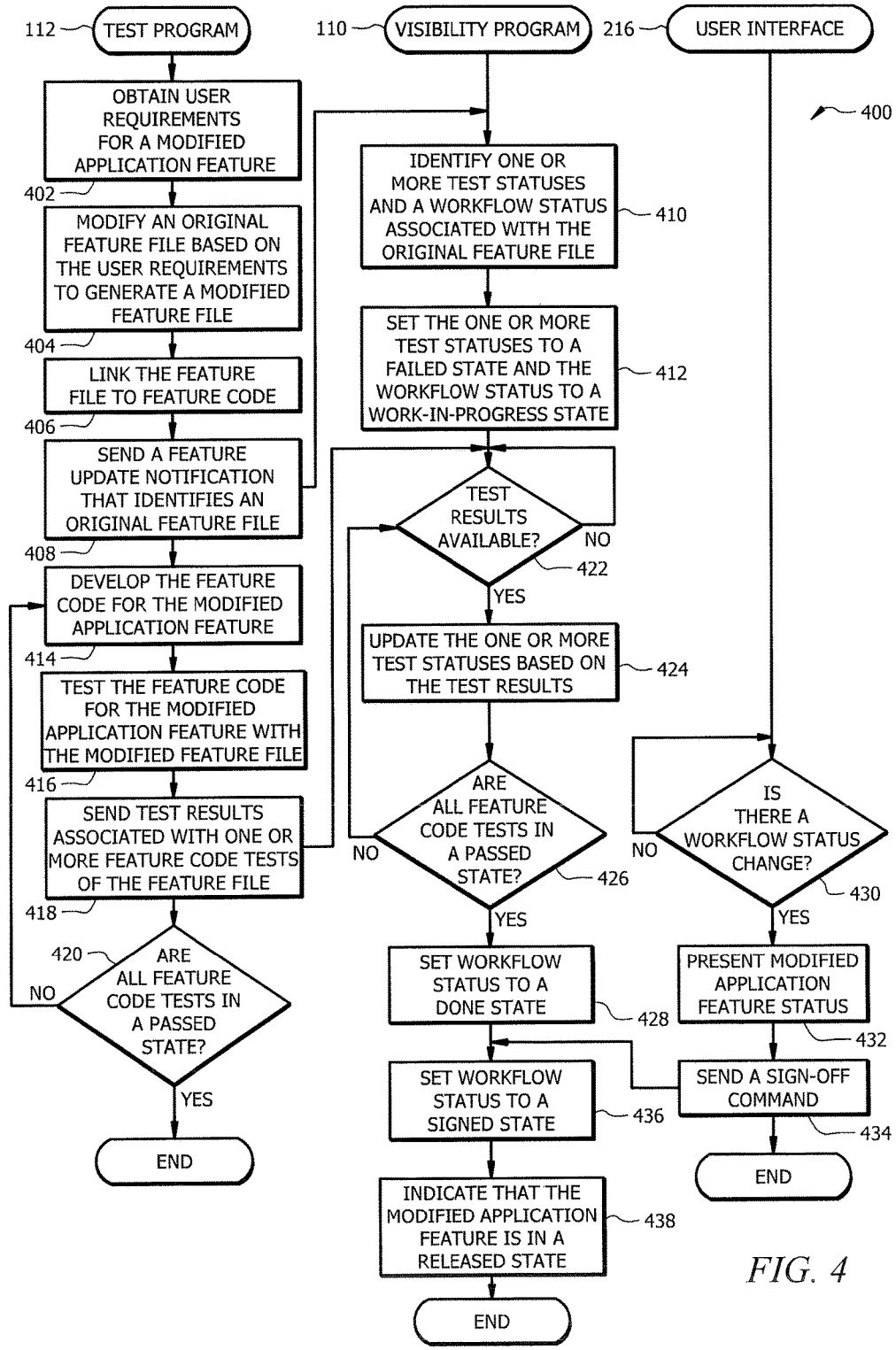
FIG. 4 is a protocol diagram of an embodiment of a feature modification method using the test program and the visibility program.

FIG. 4 is a protocol diagram of an embodiment of a feature modification method 400 using the test program 112 and the visibility program 100. Method 400 may be employed to use interprogram communication messaging to trigger and track events during the development cycle of an application feature being modified. In contrast to method 300 in FIG. 3, method 400 is may be employed to modify test statuses 212 and workflow status 214 associated with existing application features and feature files 206. In order to perform method 400, the test engine 122 is configured to implement a specific algorithm using the test program 112 and the visibility engine 120 is also configured to implement a specific algorithm using the visibility program 110. In an embodiment, the test program 112 may send interprogram communication messages 250 to the visibility program 110 to identify test statuses 212 and workflow statuses 214 associated with a feature file 206 for an application feature to be modified. The feature file 206 is associated with a feature code 204 for the modified application feature. The test program 112 sends interprogram communication messages 250 to the visibility program 110 to trigger status changes for the test statuses 212 and workflow status 214 based on events during the development and testing of the modified feature code 204. The visibility program 110 modifies test statuses 212 and workflow status 214 in response to interprogram communication messages 250 from test program 112. The visibility program 110 then allows a user to review test statuses 212 and workflow status 214 for the modified application features and to modify workflow statuses 214 in response to sign-off commands 264 from the user.

At step 402, the test program 112 obtains user requirements for a modified application feature. The process for obtaining the user requirements may be performed similarly to as described in step 302 in FIG. 3. At step 404, the test program 112 modifies an original feature file 206 based on the user requirements to generate a modified feature file 206. For example, the test program 112 may add, remove, or modify one or more feature code tests 208 in the original feature file 206 based on the user requirements. The modified feature file 206 is linked to the feature code 204 to allow the test program 112 to perform tests on the feature code 204 to tests is functionality. At step 406, the test program 112 links the feature file 206 to a feature code 204. For example, the test program 112 may associate one or more feature tests 208 to the feature code 204 to test various functionalities of the feature code 204. The one or more feature code tests 208 may be initialized in a failed state.

The test program 112 may communicate with the visibility program 110 to update the status of the application features being modified. At step 408, the test program 112 sends a feature update notification 254 that identifies an original feature file 206 to the visibility program 110. As an example, the feature update notification 254 may identify the original feature file 206 and a first feature code test 208 and a second feature code test 208 associated with the feature file 206. Sending the feature update notification 254 may trigger the visibility program 110 to associate test statuses 212 with feature code tests 208 of the feature file 206 and a workflow status 214 with the feature file 206. The test program 112 may send the feature update notification 254 via program interface 126.

In response to the feature update notification 254 the visibility program 112 may identify the one or more test statuses 212 and workflow statuses 214 for the application feature to update their statuses. At step 410, the visibility program 110 identifies one or more test statuses 212 and a work flow status 214 associated with the original feature file 206. For example, the visibility program 110 identifies a first test status 212 associated with the first feature code test 208, a second test status 212 associated with the second feature test code 208, and a workflow status 214 associated with the feature file 206. At step 412, the visibility program 110 sets the test statuses 212 to a failed state and the workflow state 214 to a work-in-progress state. For example, the visibility program 110 changes the status of the first test status 212 and the second test status 212 to a failed state and changes the workflow status 214 associated with the feature file 206 to a work-in-progress state.

After the feature file 206 has been linked to the feature code 204, the developer may begin generating or modifying code for the application feature (i.e. the feature code 204). At step 414, the test program 112 develops the feature code 204 for the modified application feature. For example, the developer may generate or import code into the test program 112 for the feature code 204 to implement various functionalities of the modified application feature. The developer may periodically test the functionality of the developed feature code 204 using the feature file 206. At step 416, the test program 112 tests the feature code 204 for the modified application feature with the modified feature file 206. For example, the feature code 204 may be tested by feature code tests 208 to determine whether the feature code 204 achieves a particular functionality. The test program 112 modifies the status of the feature code tests 208 from a failed state to a passed state when the feature code 204 is able to achieve the functionality that is being tested by a feature code test 208. The test program 112 may periodically send test results 258 to the visibility program 110 to update the test statuses 212 and/or workflow statuses 214 associated with the feature file 206. At step 418, the test program 112 sends test results 258 associated with one or more feature code tests 208 of the feature file 206 to the visibility program 110. The test results 258 indicate whether the first feature code test 208 and the second feature code test 208 are in a failed state or in a passed state. The test program 112 may send the test results 258 via program interface 126. The test program 112 may continue to develop and test the feature code 204 until the request functionality is available. At step 420, the test program 112 determines whether all of the feature code tests 208 of the feature file 206 are in a passed state. The test program 112 returns to step 414 for further development and/or testing when one or more of the feature code tests 208 are not in a passed state. Otherwise, the test program 112 may wait for further instructions, user requirements, or requests, for example, by returning to step 402 or the test program 112 may terminate.

The visibility program 112 may periodically update the test statuses 212 associated with feature files 206 in the test program 110. At step 422, the visibility program 110 determines whether there are test results 258 available from the test program 112. In an embodiment, the visibility program 110 may receive test results 258 continuously as they become available. In another embodiment, the visibility program 110 may check for and receive test results 258 from the test program 112 at predetermined time intervals. The visibility program 110 proceeds to step 424 when test results 258 are available from the test program 112. Otherwise, the visibility program 110 continues to wait for test results 258. At step 424, the visibility program 110 updates the first test status 212 and the second test status 212 based on the test results 258. The visibility program 110 may change the status of the first test status 212 and/or the second test status 212 from a failed state to a passed state in response to receiving test results 258 that indicate the first feature code test 208 or the second feature test code 208 are in a passed state, respectively.

The visibility program 112 may also periodically update the workflow statuses 214 associated with feature files 206 in the test program 110 by examining the test statuses 212 associated with the workflow status 214. At step 426, the visibility program 110 determines whether all of the feature code tests 208 of the feature file 206 are in a passed state. For example, the visibility program 110 may use the status of the first test status 212 and the second test status 212 to determine whether the first feature code test 208 and the second feature code test 208 are in a passed state, respectively. The visibility program 110 may determine that all of feature code tests 208 of the feature file 206 are in a passed state when both the first test status 208 and the second test status 208 are in a passed state. The visibility program 110 proceeds to step 428 when all of the feature code tests 208 of the feature file 206 are in a passed state. Otherwise, the visibility program 110 returns to step 422 when one or more of the feature code tests 208 of the feature file 206 are not in a passed state. At step 428, the visibility program 110 sets the workflow status 214 to a done state in response to determining that all of the feature code tests 208 of the feature file 206 are in a passed state.

An authorized user may use the user interface 216 to review and approve application features that are being developed by test program 112. At step 430, the user interface 216 determines whether there is workflow status 214 change. The user interface 216 may determine whether there is a workflow status 214 change using a process similar to as described in step 330 in FIG. 3. The user interface 216 proceeds to step 432 when the user interface 216 determines that there has been a workflow status 214 change. Otherwise, the user interface 216 may continue to wait and check for workflow status 214 changes. At step 432, the user interface 216 presents the workflow status 214 associated with the modified application feature to a user. For example, the user interface 216 may present the workflow status 214 on the GUI 116 to a user. At step 434, the user interface 216 may receive a user action from a peripheral hardware and may sent the sign-off command 264 to the visibility program 110 in response to receiving the user action. The user interface 216 may wait for other workflow status changes, for example, by returning to step 430, or the user interface 216 may terminate.

The visibility program 110 may update the workflow status 214 of application features being developed to indicate whether they have been approved for release by an authorized user. At step 436, the visibility program 110 sets the workflow status 214 to a signed state in response to receiving the sign-off command 264 from the user interface 216. Setting the workflow status 214 to the signed state may indicate that a user approves of the modified application feature for release. At step 438, the visibility program 110 indicates that the modified application feature is in a released state in response to setting the workflow status 214 to the signed state. The visibility program 110 may wait for other interprogram communication messages 250 or the visibility program 110 may terminate.

Figure 5:
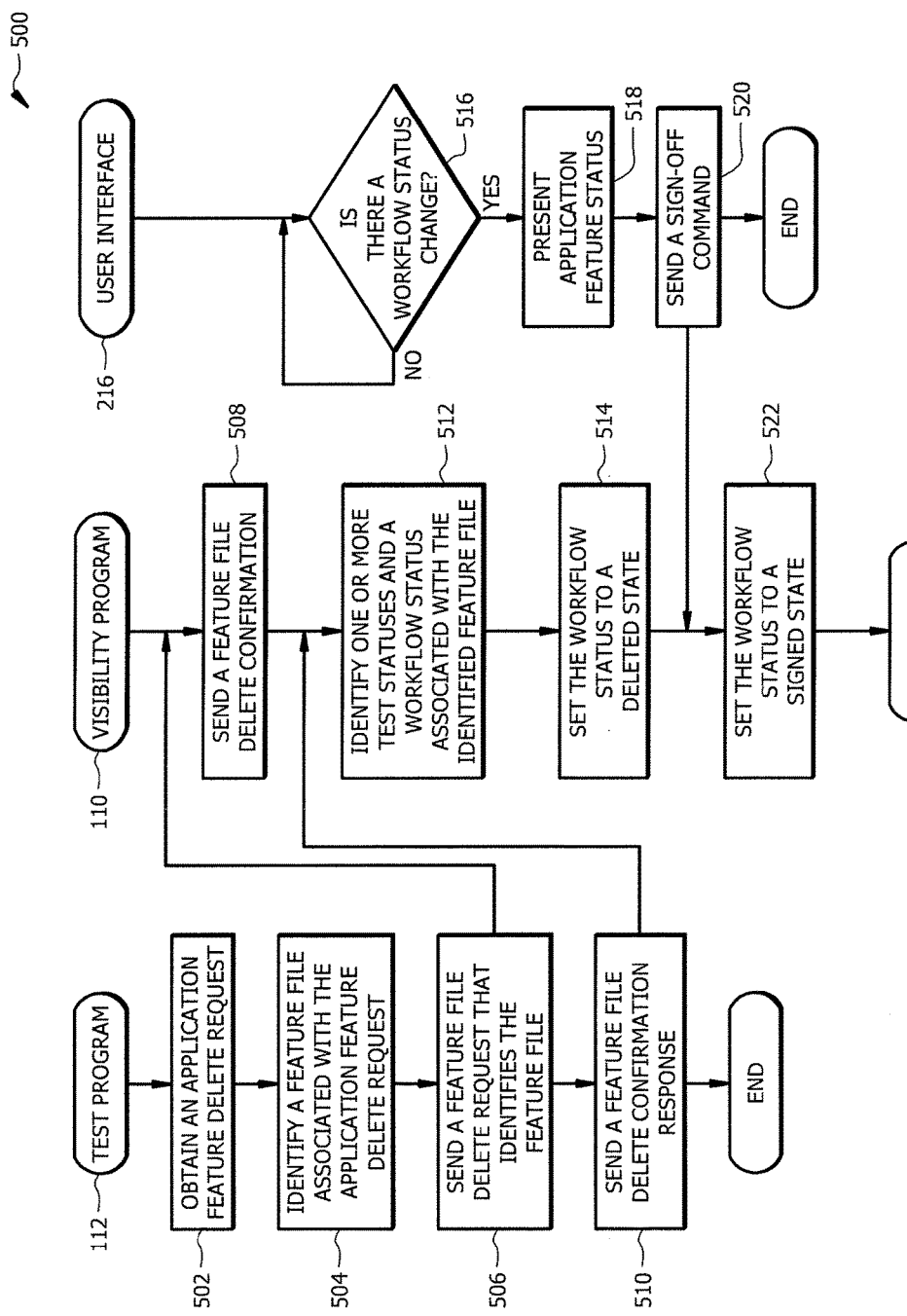
FIG. 5 is a protocol diagram of an embodiment of a feature delete method using the test program and the visibility program.

FIG. 5 is a protocol diagram of an embodiment of a feature delete method using the test program 112 and the visibility program 110. Method 500 may be employed to use interprogram communication messaging to trigger and track events when deleting an application feature and the feature code 204 and the feature file 206 associated with the application feature. In order to perform method 500, the test engine 122 is configured to implement a specific algorithm using the test program 112 and the visibility engine 120 is also configured to implement a specific algorithm using the visibility program 110. In an embodiment, the test program 112 may send interprogram communication messages 250 to the visibility program 110 to modify test statuses 212 and a workflow status 214 associated with a feature file 206 to indicate that the feature file 206 has been deleted. The visibility program 110 allows the user to review the test statuses 212 and the workflow status 214 and to sign-off on the deleted application feature.

A user may request for an application feature to be deleted using the test program 112. At step 502, the test program 112 obtains an application feature delete request. For example, a user may send a delete request to test program 112 for a particular application feature to be deleted. At step 504, the test program 112 identifies a feature file 206 associated with the application feature identified in the application feature delete request. The test program 112 may communicate with the visibility program 110 to update the status of the application features being deleted. At step 506, the test program 112 sends a feature file delete request 256 that identifies the feature file 206 to the visibility program 110. As an example, the feature file delete request 256 may identify a feature file 206 and a first feature code test 208 and a second feature code test 208 associated with the feature file 206. Sending the feature file delete request may trigger the visibility program 110 to modify test statuses 212 associated with feature code tests 208 in the feature file 206 and a workflow status 214 associated with the feature file 206. The test program 112 may send the feature delete request 256 via the program interface 126.

The visibility program 110 may communicate with the test program 112 to confirm the delete request prior to updating the test statuses 212 and the workflow statuses 214 associated with the feature file 206. At step 508, the visibility program 110 sends a feature file delete confirmation 260 to the test program 112. The visibility program 110 may send the feature file delete confirmation 260 to confirm the deletion of the application feature and an associated feature file 206. At step 510, the test program 112 sends a feature file delete confirmation response 262 to the visibility program 110. The test program 112 sends the feature file delete confirmation 262 to confirm the deletion. The test program 112 may wait for other requests or the test program 110 may terminate. In an embodiment, steps 508 and 510 may be omitted.

In response to the delete request 256 the visibility program 112 may identify the one or more test statuses 212 and workflow statuses 214 for the application feature to update their statuses. At step 512, the visibility program 110 identifies one or more test statuses 212 and a work flow status 214 associated with the feature file 206. For example, the visibility program 110 identifies a first test status 212 associated with the first feature code test 208, a second test status 212 associated with the second feature test code 208, and a workflow status 214 associated with the feature file 206. At step 514, the visibility program 110 sets the workflow status 214 associated with feature file 206 to a deleted state. In an embodiment, the visibility program 110 may also change the status of the first test status 212 and the second test status 212 to a failed state.

An authorized user may use the user interface 216 to review and approve application features that are being deleted by test program 112. At step 516, the user interface 216 determines whether there is workflow status 214 change. The user interface 216 may determine whether there is a workflow status 214 change using a process similar to as described in step 330 in FIG. 3. The user interface 216 proceeds to step 432 when the user interface 216 determines that there has been a workflow status 214 change. Otherwise, the user interface 216 may continue to wait and check for workflow status 214 changes. At step 518, the user interface 216 presents the workflow status 214 associated with the deleted application feature to a user. For example, the user interface 216 may present the workflow status 214 on the GUI 116 to a user. At step 434, the user interface 216 may receive a user action from a peripheral hardware and may send the sign-off command 264 to the visibility program 110 in response to receiving the user action. The user interface 216 may wait for other workflow status changes, for example, by returning to step 516, or the user interface 216 may terminate.

At step 522, the visibility program 110 sets the workflow status 214 to a signed state in response to receiving the sign-off command 264 from the user interface 216. Setting the workflow status 214 to the signed state may indicate that a user approves of the deletion of the application feature. The visibility program 110 may wait for other interprogram communication messages 250 or the visibility program 110 may terminate.

Figure 6:
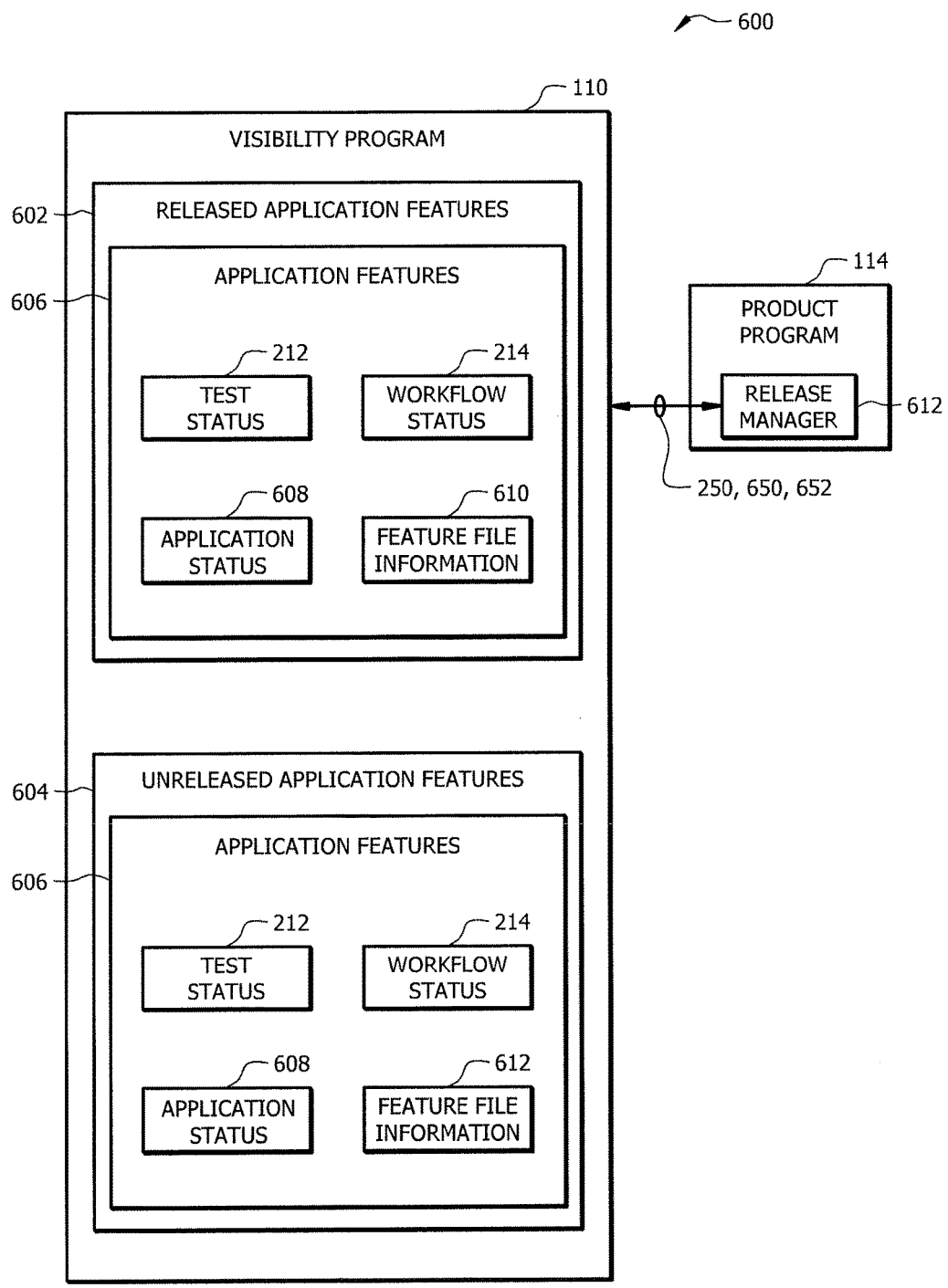
FIG. 6 is a schematic diagram of an embodiment of a configuration of the visibility program configured to communicate with a product program using interprogram communication messaging.

FIG. 6 is a schematic diagram of an embodiment of a configuration 600 of the visibility program 110 configured to communicate with the product program 114 using interprogram communication messaging. The product program 114 and the visibility program 110 may be configured to use interprogram communication messages to trigger events associated with exchanging information for application features such as released application features 602. In an embodiment, the product program 114 and the visibility program 110 may be configured to exchange data and interprogram communication messages 250 with each other via the program interface 126.

The visibility program 110 is configured to provide information to the product program 114 in response to an information request 650 from the product program 114. An example of the visibility program 110 responding to an information request 650 from the product program 114 is described in FIG. 7.

The visibility program 110 may be operable to store or access information associated with released application features 602 and unreleased application features 604. Examples of information associated with released application features 602 and unreleased application features 604 may comprise test statuses 212, workflow statuses 214, application statuses 608, and/or feature file information 610 associated with the application features 606. An application status 608 may be configured to indicate whether an application feature 606 is in a released state or an unreleased state. Feature file information 610 may comprise information for a feature file 206 that corresponds with an application feature 206. For example, feature file information 610 may comprise feature code tests 208, user requirements, feature code 204, or any other information associated with a feature file 206. The visibility program 110 may be operable to store feature files 206 or multiple versions of feature files 206. In an embodiment, the visibility program 110 may be configured to compare multiple versions of a feature file 206 and to generate a list of changes between the versions of the feature file 206. The visibility program 110 may also be operable to store release version information, release date information, temporal information (e.g. time stamps and/or date stamps), or any other information associated with application features 606 as would be appreciated by one of ordinary skill in the art upon viewing this disclosure. For example, the visibility program 110 may be operable to store temporal information for an application feature 606 that comprises a time stamp and/or a date stamp that corresponds with when the workflow status 214 associated with the application feature 606 was set to the signed state.

The product program 114 comprises a release manager 612 configured to request information for one or more application features 606 and to generate a summary or documentation based on received information for application features 606. For example, the release manager 612 may be configured to send an information request 650 that identifies an application feature 606 and to receive a release snapshot 652 that comprises information associated with the application feature 606 in response to the information request 650. The product program 114 may be further configured to generate a summary or documentation using the received information, to present the received information, and/or any other operations with the received information.

Figure 7:
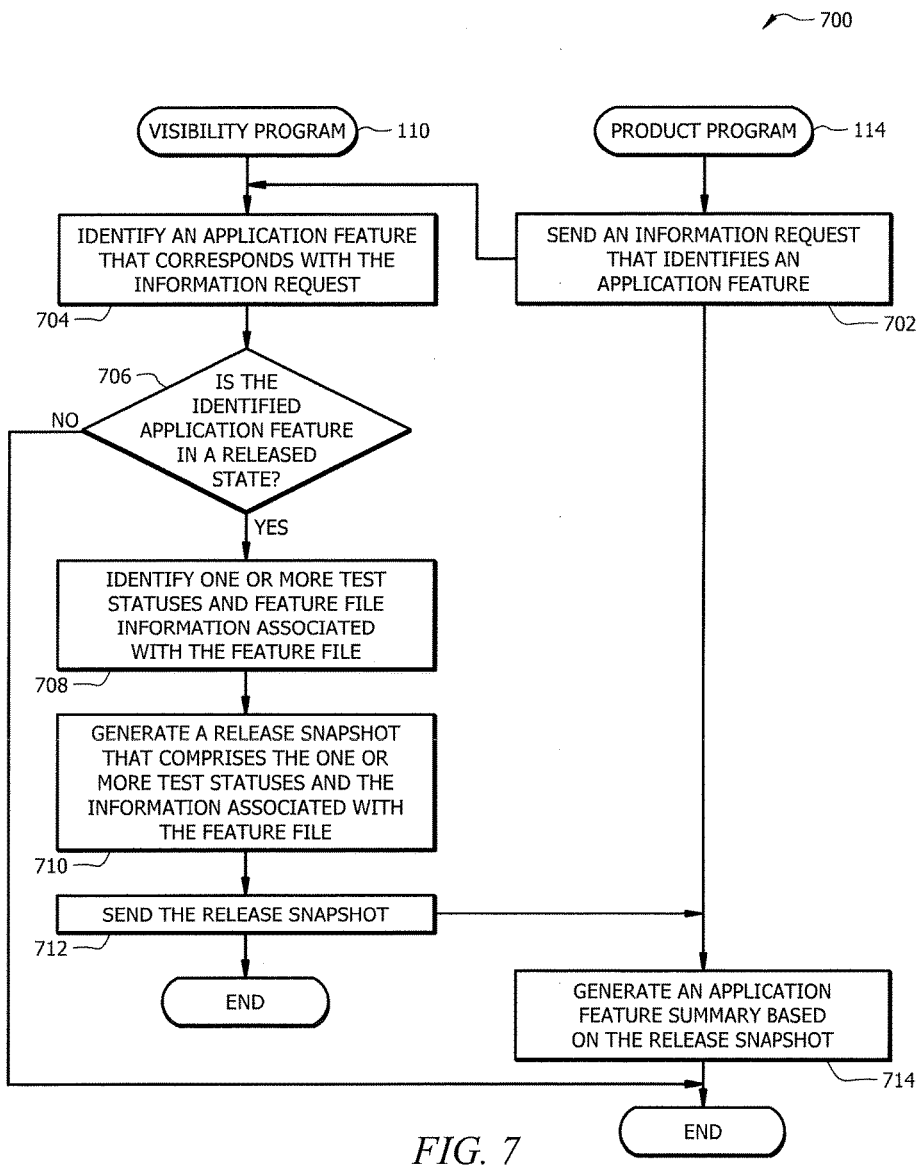
FIG. 7 is a protocol diagram of an embodiment of a release snapshot generation method using the visibility program and the product program.

FIG. 7 is a protocol diagram of an embodiment of a release snapshot generation method 700 using the visibility program 110 and the product program 114. Method 700 may be employed to use interprogram communication messaging to trigger events associated with exchanging information associated with application features 606. In order to perform method 700, the visibility engine 120 is configured to implement a specific algorithm using the visibility program 110 and the product engine 124 is also configured to implement a specific algorithm using the product program 114. In an embodiment, the product program 114 may send interprogram communication messages 250 to the visibility program 110 to request information associated with an application feature 606 (e.g. released application features 602). The visibility program 110 may identify information associated with the application features 606 and send the requested information associated with the application features 606 to the product program 114.

A user may use the product program 114 to request information from the visibility program 110 about one or more application features 606. At step 702, the product program 114 sends an information request 650 that identifies an application feature 606 to the visibility program 110. The information request may comprise a feature name, a version number, a release date, or any other information for identifying the application feature 606. For example, the product program 114 may send an information request 650 that requests test statuses 212 and feature file information 610 for the most recent version of a particular application feature 606. The product program 114 may send the information request 650 via the program interface 126.

At step 704, the visibility program 110 identifies an application feature 606 that corresponds with information provided in the information request 650. For example, the visibility program 110 may search for the application feature 606 based on the feature name and version number. In an embodiment, the visibility program 110 may identify the most recent version of the application feature 606 when multiple versions exist. As an example, the user of the product program 114 may be requesting information the most recent version of application feature 606 that has been released. At step 706, the visibility program 110 determines whether the requested application feature 606 is in a released state. For example, the visibility program 110 may check the application status 608 of the identified application feature 606 to determine whether the requested application feature 606 is in a released state. The visibility program 110 proceeds to step 708 when the visibility program 110 determines that the identified application feature 606 is in a released state. In one embodiment, the visibility program 110 may determine whether a previous version of the identified application feature 606 is in a released state when the most recent version is not in a released state and other versions exist. In another embodiment, the visibility program 110 may send a response indicating that the requested application 606 is not in a released state to the product program 114.

The visibility program 110 may gather the requested information to send to the product program 114 once the requested application feature 606 has been identified. At step 708, the visibility program 110 identifies test statuses 212 and feature file information 610 for the application feature 606. At step 710, the visibility program 110 generates a release snapshot 652 that comprises the test statuses 212 and the feature file information 610 for the application feature 606. In an embodiment, generating the release snapshot 652 comprises combining the feature file information 612 and the one or more test statuses 212 by mapping the one or more test statuses 212 to corresponding feature code tests 208. The release snapshot 652 may further comprise any other additional information associated with the application feature 606. At step 712, the visibility program 110 sends the release snapshot 652 to the product program 114. The visibility program 110 may wait for other interprogram communication messages 250 or the visibility program 110 may terminate.

The product program 114 may present the received information to the user in response to receiving the release snapshot 652 from the visibility program 110. At step 714, the product program 114 generates an application feature summary based on the release snapshot 652. The product program 114 may reorganize or reformat the information provided in the release snapshot 652 to generate the summary. In an embodiment, the product program 114 may present at least a portion of the information provided in the release snapshot 652 to a user, for example, using a GUI. In another embodiment, the product program 114 may generate a document, for example, a text file that comprises at least a portion of the information provided in the release snapshot. The product program 114 may send other interprogram communication messages 250 or the product program 114 may terminate.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. §112(f) as it exists on the date of filing hereof unless the words "means for" or "step for" are explicitly used in the particular claim.

The invention claimed is:

1. An interprogram communication system comprising:
   a memory operable to store one or more test statuses and feature file information;
   a product engine implemented by a processor operably coupled to the memory, and configured to:
      send an information request that identifies an application feature to a visibility engine via a program interface;
      receive a release snapshot that comprises one or more test statuses and feature file information associated with a feature file in response to sending the information request;
      generate a summary that comprises the one or more test statuses and at least a portion of the feature file information; and
      present the one or more test statuses and at least a portion of the feature file information on a graphical user interface;
   the program interface implemented by the processor operably coupled to the memory, and configured to:
      send the information request to the visibility engine; and
      send the release snapshot to the release snapshot to the product engine; and
   the visibility engine implemented by the processor operably coupled to the memory, and configured to:
      identify the feature file associated with the application feature based on the information request, wherein a workflow status associated with the feature file is in a signed state;
      identify one or more test statuses associated with the feature file;
      combine the one or more test statuses with feature file information associated with the feature file to generate the release snapshot; and
      send the release snapshot to the product engine via the program interface.

2. An interprogram communication method comprising:
   sending, by a product engine implemented by a processor, an information request that identifies an application feature to a visibility engine via a program interface implemented by the processor, wherein the application feature is a function performed by an application;
   identifying, by the visibility engine, a feature file associated with the application feature based on the information request, wherein a workflow status associated with the feature file is in a signed state;
   identifying, by the visibility engine, one or more test statuses associated with the feature file;
   combining, by the visibility engine, the one or more test statuses with feature file information associated with the feature file to generate a release snapshot;
   sending, by the visibility engine, the release snapshot to the product engine via the program interface;
   receiving, by the product engine, the release snapshot that comprises the one or more test statuses and the feature file information associated with the feature file; and
   generating, by the product engine, a summary that comprises the one or more test statuses and at least a portion of the feature file information on a graphical user interface.

3. The method of claim 2, further comprising presenting, by the product engine, the one or more test statuses and at least a portion of the feature file information on a graphical user interface.

4. The method of claim 2, wherein the feature file information comprises a feature code test associated with the feature file.

5. The method of claim 2, wherein the feature file information comprises a workflow status associated with the feature file.

6. The method of claim 2, wherein identifying the feature file associated with the application feature comprises selecting the most recent version of the feature file in a released state.

7. The method of claim 2, wherein identifying the feature file associated with the application feature comprises determining whether the application feature is in a released state is based on an application status associated with the application feature.

8. The method of claim 2, wherein combining the one or more test statuses with feature file information associated with the feature file comprising mapping the one or more test statuses to corresponding feature code tests.

9. The method of claim 2, wherein the feature file information comprises temporal information corresponding with when a workflow status of the feature file transitioned to a signed state.

10. The method of claim 2, wherein identifying the feature file associated with the application feature comprises determining a workflow status of the application feature is in a signed state.

11. An interprogram communication system comprising:
   a memory operable to store one or more test statuses and feature file information;
   a product engine implemented by a processor operably coupled to the memory, and configured to:
      send an information request that identifies an application feature to a visibility engine via a program interface, wherein the application feature is a function performed by an application;
      receive a release snapshot that comprises one or more test statuses and feature file information associated with a feature file from the visibility engine in response to sending the information request;
      generate a summary that comprises the one or more test statuses and at least a portion of the feature file information;
   the program interface implemented by the processor operably coupled to the memory, and configured to:
      send the information request to the visibility engine; and
      send the release snapshot to the product engine; and
   the visibility engine implemented by the processor operably coupled to the memory, and configured to:

identify the feature file associated with the application feature based on the information request, wherein a workflow status associated with the feature file is in a signed state;

identify one or more test statuses associated with the feature file;

combine the one or more test statuses with feature file information associated with the feature file to generate the release snapshot; and send the release snapshot to the product engine via the program interface.

12. The system of claim 11, wherein the product engine is configured to present the one or more test statuses and at least a portion of the feature file information on a graphical user interface.

13. The system of claim 11, wherein the feature file information comprises a feature code test associated with the feature file.

14. The system of claim 11, wherein the feature file information comprises a workflow status associated with the feature file.

15. The system of claim 11, wherein identifying the feature file associated with the application feature comprises selecting the most recent version of the feature file in a released state.

16. The system of claim 11, wherein identifying the feature file associated with the application feature comprises determining whether the application feature is in a released state based on an application status associated with the application feature.

17. The system of claim 11, wherein combining the one or more test statuses with feature file information associated with the feature file comprising mapping the one or more test statuses to corresponding feature code tests.

18. The system of claim 11, wherein the feature file information comprises temporal information corresponding with when a workflow status of the feature file transitioned to a signed state.

19. The system of claim 11, wherein identifying the feature file associated with the application feature comprises determining a workflow status of the feature file is in a signed state.

20. The system of claim 11, wherein the feature file information comprises a list of changes associated with the feature file.

\* \* \* \* \*